United States Patent
Pierce

[11] 3,718,434
[45] Feb. 27, 1973

[54] APPARATUS AND METHOD FOR DETECTING GASEOUS CONTAMINANTS

[76] Inventor: Russell W. Pierce, Broadway & Elm Streets, Hanover, Mass. 02339

[22] Filed: Jan. 13, 1972

[21] Appl. No.: 217,583

[52] U.S. Cl..............23/232 R, 23/254 R, 73/23 R
[51] Int. Cl................................G01n 7/10
[58] Field of Search.........23/232, 232 E, 254, 254 E, 23/255 E; 73/23 R, 29

[56] References Cited

UNITED STATES PATENTS

| 3,242,717 | 3/1966 | Matle et al............23/254 X |
| 3,437,446 | 4/1969 | Pierce................23/254 E |
| 3,567,383 | 3/1971 | Langley...............23/232 E |

Primary Examiner—Morris O. Wolk
Assistant Examiner—R. E. Serwin
Attorney—Joseph M. Lane et al.

[57] ABSTRACT

Method of detecting gaseous contaminants by monitoring the rate of diffusion of a given gas through a selectively permeable metallic surface which is reversibly poisoned by the contaminants. Apparatus for practicing method.

24 Claims, 1 Drawing Figure

3,718,434
PATENTED FEB 27 1973
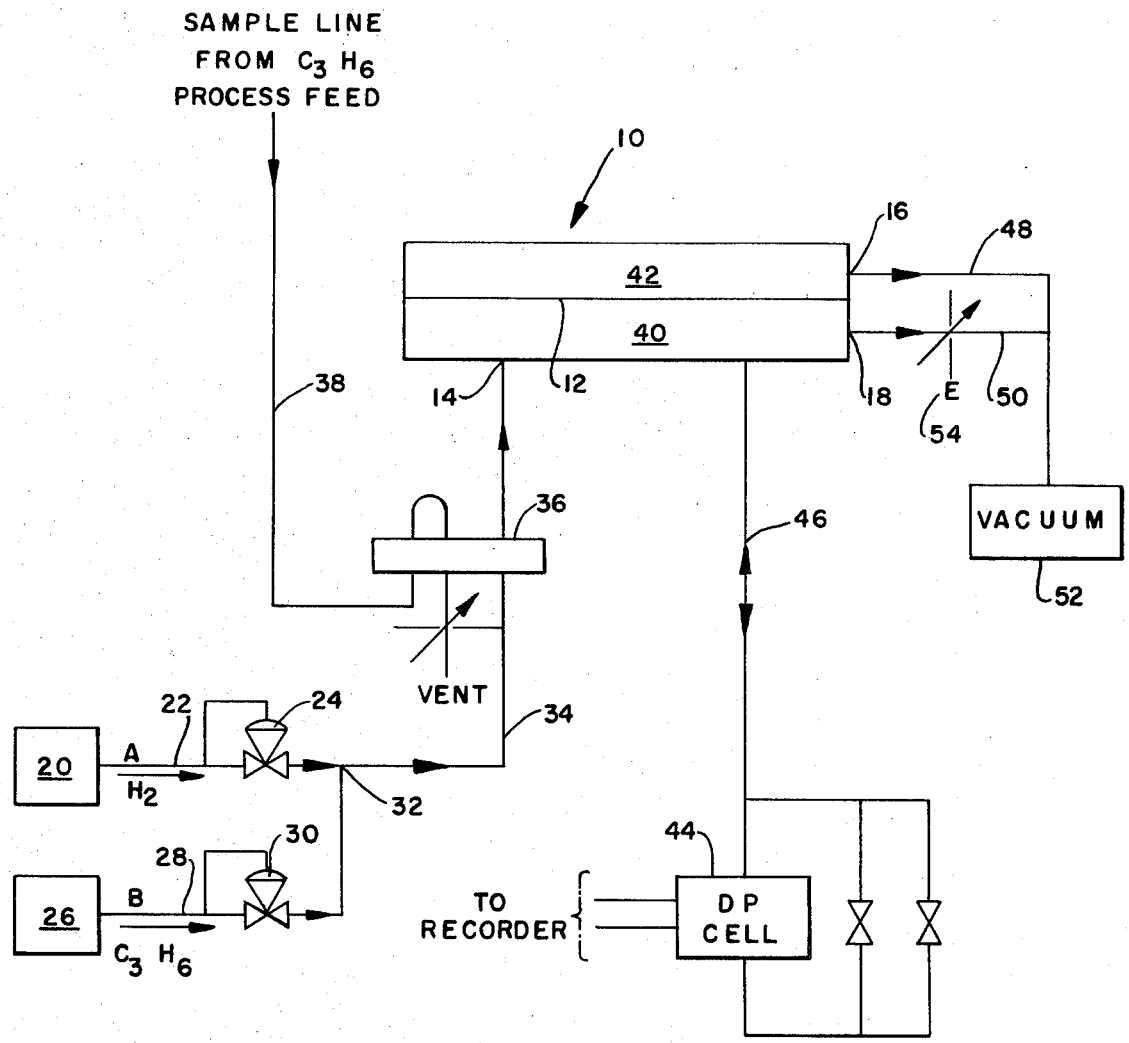

APPARATUS AND METHOD FOR DETECTING GASEOUS CONTAMINANTS

BACKGROUND OF THE INVENTION

The field of the present invention is a method and device for detecting the presence of gaseous contaminants.

Since the man-generated gaseous sulphur compounds which are exhausted into the troposphere as pollutants, are represented principally by $SO_2$, $SO_3$, and $H_2S$, an estimation of the sum of these three chemicals is usually sufficient to warn of dangerously high atmospheric sulphur levels. These compounds, even in small concentrations, are poisonous to life. Thus, accurate detection of these pollutants is necessary to enable enforcement of aid pollution controls.

The present invention can be used to monitor the ambient air, stack gases, flue gas streams, automotive exhaust, etc. for the presence of the above-mentioned contaminants. This invention also relates to an apparatus and method for the protection of catalysts employed in various chemical manufacturing processes.

Prior art methods for the detection of such contaminants, either in the atmosphere or in industrial gas streams, which involve analysis with chemical reagents, are too cumbersome and too slow to be of much practical utility. Other known methods tend to be insensitive and expensive to install and operate.

My earlier invention (U.S. Pat. No. 3,437,446, issued Apr. 8, 1969) utilizes the reversible poisoning effect of sulphur compounds on palladium as a means of detecting the presence of those sulphur compounds. My earlier invention monitored the "poisoning" effect (and sulphur compound concentration) by measuring changes in the electrical resistivity of the palladium element.

SUMMARY OF THE INVENTION

The present invention monitors the poisoning effect (and contaminant concentration) by measuring changes in the flow rate for a gas diffusing through a selectively permeable metallic element. The changes in the rate of diffusion occur as the metallic sensing element is successively poisoned by the contaminants and purged by a diffusible gas.

Accordingly, it is an object of the present invention to provide an improved device for the detection of gaseous contaminants.

Another object is to provide a rapid, sensitive and relatively inexpensive means for the detection of gaseous contaminants.

Yet another object of this invention is to provide an apparatus for a method of detecting sulphur-containing compounds such as sulphur dioxide in gaseous environments.

Other objects and further scope of applicability of the present invention would become apparent from the detailed description to follow, taken in conjunction with the accompanying drawing.

BRIEF DESCRIPTION OF THE DRAWING

The drawing is a schematic flow diagram representing a detection system employing the apparatus of this invention.

DESCRIPTION OF THE PREFERRED EMBODIMENTS

At the outset, the invention is described in its broadest aspects.

The present invention involves a means for detecting a gaseous contaminant which is capable of reversibly poisoning a sensing element. This invention monitors the poisoning effect (and contaminant concentration) by measuring the rate of diffusion of a diffusible gas through a selectively permeable metallic element. The metallic sensing element is formed with external and internal diffusing surfaces. The rate of diffusion undergoes relatively large changes as the permeable metal element is successively poisoned by the contaminant and purged by the diffusible gas. The changes in the rate of diffusion are large enough to be easily measured by standard instruments such as differential pressure cells. The sensing element may be a metallic foil, metallic tube, or a supported metallic surface that is permeable to hydrogen or other diffusible gas. The method of detection involves bringing a standard gas stream containing a constant concentration of the diffusible gas into contact with the external diffusing surface of the permeable metal portion of the sensing element and maintaining a lower concentration of the diffusible gas at the internal diffusing surface thereby creating a partial pressure differential for the diffusible gas across the permeable metal and causing that gas to diffuse therethrough. The lower concentration for the diffusible gas at the internal diffusing surface may be maintained by purging that surface by a vacuum technique, or by any other suitable method. A sample of the gaseous environment to be tested is mixed with the gas stream coming into contact with the external diffusing surface of the sensing element. If the sample contains a contaminant, the sensing element will become poisoned and thereby less permeable. The resumption of flow of a non-contaminated gas stream containing a diffusible gas serves to purge the metallic sensing element and thereby restore its permeability. The flow of diffusible gas through the element may be measured directly (e.g., monitoring pressure changes in the diffusing gas stream on the internal side of the sensing element) or indirectly (e.g., monitoring the pressure changes in the gas stream passing across the external diffusing surface of the sensing element).

In the preferred embodiment, the sensing element is made from an alloy containing approximately 60 percent palladium and 40 percent copper. The hydrogen permeability of this alloy is several times as great as that of palladium. Accordingly, the sensitivity of the device of this invention is greatly increased when the sensing element is made from the above alloy.

An even higher degree of permeability can be obtained by constructing the metallic sensing element in the form of a metallic layer on a porous substrate.

Palladium metal and some of its alloys are remarkably permeable to gaseous hydrogen under certain circumstances. The driving force which causes a gas, e.g. hydrogen, to diffuse through sections of those metals is a concentration gradient arising from a hydrogen partial pressure differential across the metal foil or membrane. As the $\Delta P_{H_2}$ is increased, the rate and volume of gas diffusion through the metal also increases. The hydrogen diffusion rate through a square centimeter of pure palladium foil, one one-thousandth of an inch thick and held at 350°C, is approximately one-tenth of a standard liter per minute per atmosphere of pressure difference across the palladium foil. A delta $\Delta P_{H_2}$ can be established across the sensing element by evacuation of the downstream atmosphere using any standard vacuum apparatus or by means of purging the downstream atmosphere with another gas, e.g. nitrogen.

In the case of hydrogen diffusion through palladium, diatomic hydrogen is first adsorbed onto the external palladium surface in an amount dependent on the upstream hydrogen pressure. Dissociation of the hydrogen then occurs and the hydrogen atoms enter the interior lattice of the metal to form something analogous to a metal-hydrogen alloy. This alloy, while showing appreciable strength associated with its Pd—H bonds, is not spatially fixed and individual hydrogen atoms move about rather freely subject to a variety of influences, including their own concentration gradient and the temperature of the metal. In the diffusion process, the hydrogen atoms eventually reach the downstream or internal metallic surface where the reverse of the upstream surface phenomenon occurs, and the atomic hydrogen reacts to form diatomic molecules which then desorb as a gas.

It appears that in the case of metal of thicknesses less than one one-thousandth of an inch thick, that the overall diffusion rate is limited primarily by the external and internal surface adsorption and desorption rates. In contrast, in the case of foils thicker than three or four thousandths of an inch, the overall diffusion rate is limited by the transport rates for the movement of hydrogen atoms (protons) through the interior lattice of the metal.

The poisoning effect on the palladium metal produced by sulfur compounds involves the chemisorption of sulfur atoms at the surface of the palladium metal. In this manner, sites otherwise available for hydrogen adsorption become strongly bonded to the relatively large sulfur atoms and thus sterically block the incoming hydrogen molecules from contact with the palladium. This poisoning effect is caused by both the large size of the adsorbed sulfur atom and by the high bond strength of the sulfur-palladium bond. The addition of 1 ppm $H_2S$ to the hydrogen containing feed stream will reduce the hydrogen diffusion rate approximately 1 percent. The hydrogen diffusion rate will remain constant so long as the $H_2S:H_2$ ratio in the feed stream remains unchanged. Surprisingly, the hydrogen diffusion rate will return to its initial value if the $H_2S$ is removed from the feed stream.

The combined effect of increasing $P_{H_2S}$ or $P_{H_2}$ is inversely proportional to the hydrogen sulphide partial pressure and directly proportional to the hydrogen partial pressure. By $P_{H_2S}$ is meant the equivalent of any sulfur compound which can react with $H_2$ over palladium at 350°C to form $H_2S$. A rate equation for the combination of the two effects may be written as follows:

$$t = k' P_{H_2} \frac{P_{H_2}}{(P_{H_2S})} = k'(P_{H_2})^2/(P_{H_2S}) \qquad \text{eq. 1}$$

where;

$t$ = diffusion rate of hydrogen through the metal foil. Expressed in std. $cm^3/cm^2/$ atm/mil of foil thickness, $P_{H_2S}$, $P_{H_2}$ = partial pressures of hydrogen sulphide and hydrogen, respectively, in atmospheres, and $k'$ = a proportionality constant having appropriate units and having different values which increase with the operating temperature.

If we operate the apparatus at some constant hydrogen partial pressure such as one-half atmosphere, for example, then eq.1 becomes:

$$= k(\overline{P_{H_2S}})^{-1} \qquad \text{eq. 2}$$

which is true, at least for short ranges of $P_{H_2S}$ at constant $\overline{P_{H_2}}$. Even though the proportionality and linearity implied in eq.2 is by no means true over wide ranges of hydrogen sulphide to hydrogen partial pressure ratios, the hydrogen diffusion rate behavior with respect to hydrogen sulphide levels is reproduceable so that one is able to calculate hydrogen sulphide levels accurately from calibration data.

It has been discovered that the flow rates for hydrogen, both through and across the sensing element, undergo significant and easily measured changes in accordance with the changes in the $P_{H_2S}:P_{H_2}$ ratio discussed above.

The present invention involves various methods of dynamic flow measurement as means for monitoring the changes in the rate of hydrogen diffusion which in turn correspond to changes in the amounts of sulfur contaminants in the feed gas. The dynamic flow measurement may be made by means of differential pressure apparatus or other conventional apparatus.

The sensing element used in the detection system of this invention is a selectively permeable metallic element. By selective it is meant that the metal of the sensing element is permeable with respect to only a specific diffusible gas, e.g. hydrogen, but is impervious to other gases in its environment. The physical shape and structure of the permeable metallic element may assume any one of a wide variety of different forms. The sensing element may be a thin foil, capilliary tube, or a thin film of the desired metal deposited on a microporous substrate, e.g. a porous ceramic, porous vycor glass, or a nickel-electric-arc smoke-plated, sintered composite.

For the detection of sulfur compounds the metal employed in the sensing element may be palladium, platinum, palladium alloys such as palladium-silver, palladium-copper, palladium-nickel, and palladium-copper-nickel alloys, or other metals selectively permeable to hydrogen and capable of being reversibly poisoned by the contaminants being monitored. An alloy containing approximately 40 weight per cent copper, and the balance palladium has been found to be particularly effective when used for the purposes of this invention. The 40 percent copper – 60 percent palladium alloy has a hydrogen permeability several times as great as that of palladium alone. Accordingly, detectors utilizing this alloy are much more sensitive and have a quicker response time.

Substrates which may be used to support a metallic film, to form a sensing element, may have microporous structures, i.e. interconnected passageways of holes on the order of 10 to 100 Angstrom units ($1A = 10^{-8}$ cm) in diameter. The metal film may be deposited on the substrate by any conventional method such as by vapor plating, electro.plating, vacuum deposition and the like. Sensing elements of this type, wherein the supported metallic film has a thickness of 0.5 to 5 mil, are preferred because the surface to volume ratio between the metallic film surface and the volume of the gas stream to be monitored is maximized, thereby minimizing the bulk diffusion rate limitation on the response time of the sensing element.

Vapor deposition techniques can be used to produce the supported palladium sensing element. In one such process, palladium acetylacetonate is vaporized in a stream of an inert gas such as dry nitrogen or argon at 190°–210°C and brought into contact with a suitable substrate maintained at 220°–250°C to decompose the salt and leave a coating of palladium on the substrate. Instead of nitrogen or argon, carbon dioxide, methane, or another suitable gas may be used as the carrier. Diallyl di-chloro palladium or another volatile palladium salt may be substituted for the palladium diacetylacetonate.

Another method which has been successfully employed to produce supported palladium sensing elements is the so-called "smoke" arcplating process. This process utilizes a relatively coarse base support material, for example, a 40 mesh porous stainless steel filter. The base material is coated with nickel smoke which is produced by an electric arc between two nickel electrodes. Leaving the high temperature area of the electric arc plasma, the vaporized nickel condenses in the form of spherical drops on the surface of the stainless steel filter. The smoke deposition is continued until a layer of nickel dust from five to ten thousandths inch has been formed. The composite is then placed in a hydrogen atmosphere and sintered at approximately 500°C for several minutes. The sintered composite is compacted between polished metal mandrels under a pressure of several tons per square inch. Highly polished, hardened mandrel faces are essential, especially opposing the side of the substrate covered by the nickel arc smoke. Sheets of freshly cleaved mica may be placed between the mandrel and the smoke coated surface of the composite. The smoke deposition, sintering, and compaction steps are repeated until the layers of compacted and sintered nickel depositions total several thousandths of an inch. The composite is then vapor plated in a conventional manner to form a palladium coated sensing element.

In an alternative embodiment, changes in the pressure differential across a metallic diaphragm are measured by monitoring the deflection of the diaphragm. The apparatus used in this embodiment is an electronic pressure meter of the type marketed by MKS Instruments, Inc., under the Trademark BARATRON and which has been modified by replacing the diaphragm metal with a palladium, or copper-palladium foil and by making provision for the heating of the palladium diaphragm. If the downstream side of the palladium diaphragm is evacuated and the exit from the upstream side restricted, the diaphragm of the above apparatus will be deflected sufficiently so that it will be sensitive to a poisoning effect which would serve to temporarily decrease the amount of diffusion, increase the pressure differential, and thereby increase the deflection.

Operation of the apparatus of this invention may be best understood by reference to the drawing. For purposes of illustration, a system for monitoring a propylene process is shown. A detector, generally designated by the numeral 10, is shown provided with a palladium foil 12, a gas inlet 14, and gas outlets 16 and 18. Pure hydrogen from a bottle enters the system through line 22, which flow is controlled by valve 24. Similarly, pure propylene is admitted into the system from a source 26 through line 28 and is controlled by valve 30. The pure hydrogen and propylene mix at 32 and are directed through feed line 34 to the detector inlet 14 located at the upstream side of the palladium foil 12. An injection valve 36 is located in line 34 which valve periodically injects a sample of the propylene process stream, from line 38, into feed line 34. If the injected sample contains a sulfur contaminant, the Pd foil 12 will be poisoned to an extent dependent upon the sulfur compound to hydrogen ratio of the injected sample. When such a poisoning occurs, the amount of hydrogen leaving the detector 10 through outlet 16 will decrease and the amount of hydrogen leaving through outlet 18 will increase. This alteration of the hydrogen flow produces higher pressure at the upstream or internal side of the foil in space 40, and a lower pressure at the downstream or external side in space 42. In this example a differential pressure cell 44 is connected to the upstream space 40 by line 46 to monitor the pressure in that space which pressure is continuously recorded (the recorder is not shown). Changes in the recorded pressure are converted into values for the concentration of contaminants in the injected samples. This conversion of pressure change values into contaminant concentration values may be performed manually by reference to a calibration curve based on known values for standard samples. The conversion of values can also be automatic if an integrator-recorder is used.

Alternately, the line 46 can be connected to the downstream space 42 so that the pressure there can be monitored.

In practice, 50cc/min each of pure $H_2$ and pure $C_3H_6$ flow into the cell and out exits 16 and 18 through lines 48 and 50, respectively, to the vacuum apparatus 52. A vent 54 is provided in line 50 as a means of controlling the pressure differential between spaces 40 and 42 and thereby controlling the rate of diffusion.

The foil 12 is heated, by any conventional means to avoid the phenomenon known as "hydrogen embrittlement." Heating the foil also serves to increase the hydrogen diffusion rate and, therefore, the sensitivity of the apparatus. A suitable operating temperature is approximately 350°C. The heated palladium or other foil must not be allowed to cool below a critical temperature while exposed to hydrogen. The foil will swell, embrittle, or crack, or in any event develop leaks, if the hydrogen is not "flushed" or otherwise removed before allowing the foil to cool below the critical temperature. This effect is believed to be caused by hydrogen protons occupying a position in the lattice between the palladium atoms causing a spreading of the lattice greater than that which can be accommodated by the elasticity of the metal below the critical temperature. The critical temperature varies with the hydrogen partial pressure, the lower the $H_2$ partial pressure, the lower the critical temperature. Hydrogen in Metals, D.

P. Smith (University of Chicago Press, 1948), at page 86, gives the critical temperature as 310°C at hydrogen partial pressures of one atmosphere. Experiments conducted with hydrogen partial pressures of two atmospheres have determined the critical temperature to be approximately 327°C. It follows that hydrogen must never be admitted when starting the apparatus from room temperature and must be removed from the apparatus before cooling below the critical temperature.

Instead of the differential pressure apparatus 44, a Katharometer can be used. If the space 42 is swept with nitrogen, the thermal conductivity of the gaseous mixture in space 42 is raised because hydrogen is a much better heat conductor than is nitrogen. Katharometry for hydrogen-nitrogen mixtures requires very modest apparatus for high sensitivity to changes in the hydrogen-nitrogen ratio. The Katharometer can also be calibrated to give read-out values representative of various levels of sulfur contaminants in the process feed stream.

If the concentration of sulfur contaminants in the process feed is low, and their presence intermediate, line 28, the propylene source 26, and the injection valve 36 may be eliminated. In this manner the process feed 38 can be continuously monitored without the sample injection procedure. As in the earlier described procedure, it is essential that the concentration of hydrogen entering at 14 remain constant.

In addition to its obvious utility in the field of environmental protection, this invention also relates to an apparatus and method for the protection of catalysts employed in various chemical manufacturing processes. It has long been known that precious metal hydrogenation catalysts (e.g., Pt, Pd, etc.) are very sensitive to such gases as hydrogen sulphide when these gases are present in the feed streams to the catalysts. The poisoning effect can be of the order of half the usual catalytic activity, even when $H_2S$ is present only to the extent of 1 to 2 parts per million.

The various embodiments described above relate to the detection of gaseous sulfur compounds. However, the invention may be applied to the detection of any gaseous contaminant capable of reversibly poisoning a selectively permeable metallic element. For example, silver and certain silver alloys are permeable to oxygen and are reversibly poisoned by nitrogen oxides. Accordingly, a detector employing silver or a silver alloy could be used in the manner described above to monitor the presence of nitrogen oxides in various gaseous environments.

The nickel and nickel alloy permeable elements previously described may also be used in combination with carbon monoxide, employed as the diffusible gas. The carbon monoxide permeation rates through these nickel and nickel alloy elements is markedly affected by poisoning by HCN, $NH_3$ and amines. Although the transport rates for carbon monoxide through nickel are lower than those for hydrogen through nickel, the presence of HCN, $NH_3$ and amines, as contaminants, may be monitored by a sensitive apparatus such as the modified BARATRON, previously described.

In yet another embodiment, the apparatus of the present invention, employing a palladium element, may be used to detect ozone. An important index of air pollution is the determination of atmospheric ozone in parts per billion (ppb) or less concentrations. It has been found that with the palladium element maintained at a constant level of sulfur poisoning, the presence of a small amount of ozone will serve to purge the element and thereby increase the rate of diffusion. These increases in the rate of diffusion can be measured and interpreted as valves for the concentration of ambient ozone by any of the methods previously described in connection with the detection of sulfur compounds. Experimentally, a high-voltage leak tester was connected to the external leads of the diffuser cell. The tester was found to produce enough ozone to momentarily "clean off" the permeability reducing layer of PdS. Because Ozone is highly reactive, the major difficulty with its detection is the problem of preserving the $O_3$ until it can be assayed. This problem may be overcome by introducing the sample suspected of containing ozone into the apparatus separately at a point very close to the external diffusing surface of the palladium or palladium alloy element.

Other changes and modifications in the devices and procedures described above will become apparent to those skilled in this art and obvious and equivalent changes are intended to be included in the scope of this invention.

I claim:

1. An apparatus for detecting the presence of a contaminant in a gaseous environment comprising:
   1. a sensing element containing a metal permeable to a specific diffusible gas, said metal being capable of being reversibly poisoned by adsorption and desorption of the contaminant and said metal having internal and external diffusing surfaces;
   2. means for bringing a gas stream containing a constant concentration of said diffusible gas into contact with said external diffusing surface of said metal;
   3. means for removing said diffusible gas from said internal surface of said metal to maintain a gaseous atmosphere at said internal surface having a concentration of said diffusible gas less than that of said gas stream, thereby creating a partial pressure differential for said diffusible gas to cause said gas to diffuse through said metal at a given rate;
   4. means for mixing a sample of the gaseous environment to be tested with said gas stream;
   5. means for monitoring said rate of diffusion through said permeable metal; and
   6. means for purging said contaminant from said permeable metal.

2. The apparatus of claim 1, wherein said permeable metal is shaped into a foil.

3. The apparatus of claim 1, wherein said permeable metal is selected from a palladium and palladium alloys.

4. The apparatus of claim 1, wherein said permeable metal is selected from silver and silver alloys.

5. The apparatus of claim 1, wherein said permeable metal is a palladium-copper alloy containing approximately 40 percent by weight copper.

6. The apparatus of claim 1, wherein said permeable metal is in the form of a capillary tube.

7. The apparatus of claim 1, wherein said sensing element comprises a coating of said permeable metal on a porous glass substrate.

8. The apparatus of claim 1, wherein said sensing element comprises a coating of said permeable metal on a sintered metal substrate.

9. The apparatus of claim 1, wherein said means for monitoring is a differential pressure cell.

10. The apparatus of claim 1, wherein said means for monitoring is a Katharometer.

11. The apparatus of claim 1, wherein said means for mixing is an injection valve which periodically injects samples of the gaseous environment to be tested into said gas stream.

12. The apparatus of claim 1, wherein said means for mixing allows a continuous flow of the gaseous environment to be tested to enter into said gas stream.

13. A process for detecting the presence of contaminants in a gaseous environment, which process employs a sensing element having a metal portion, which metal portion is permeable to a specific diffusible gas and is provided with internal and external diffusing surfaces and which is capable of being reversibly poisoned by adsorption and desorption of the contaminants, said process comprising the following steps:
1. bringing a gas stream containing a constant concentration of the diffusible gas into contact with the external diffusing surface of the metal;
2. removing the diffusible gas from the internal diffusing surface of the metal to maintain a concentration of the diffusible gas at the internal diffusing surface less than that in contact with the external diffusing surface, thereby creating a partial pressure differential for the diffusible gas and causing the diffusible gas to diffuse through the metal at a given rate;
3. mixing a portion of the gaseous environment to be tested with said gas stream;
4. measuring any changes in said rate of diffusion of the diffusible gas through the permeable metal portion of the sensing element; and
5. purging any contaminants from the permeable metal by intermediate contacting with a contaminant-free diffusible gas.

14. The process of claim 13, wherein said removal of the diffusible gas from the internal diffusing surface is effected by means of a vacuum.

15. The process of claim 13, wherein said removal of the diffusible gas from the internal diffusing surface is effected by means of purging with an inert gas.

16. The process of claim 13, wherein changes in said rate of diffusion of the diffusible gas through the permeable metal portion of the sensing element are measured by means of a differential pressure cell.

17. The process of claim 13, where changes in said rate of diffusion of the diffusing gas through the permeable metal portion of the sensing element are measured by means of a Katharometer.

18. The process of claim 13, wherein the metal which is permeable to a specific diffusible gas is selected from palladium and palladium alloys and wherein the diffusible gas is hydrogen.

19. The process of claim 13, wherein the metal which is permeable to a specific diffusible gas is selected from palladium and palladium alloys and wherein the diffusible gas is carbon monoxide.

20. The process of claim 13 wherein said gas stream additionally contains a constant concentration of a sulfur compound and wherein said purging is effected by ozone present in the portion of the gaseous environment tested.

21. The process of claim 13, wherein the metal which is permeable to a diffusible gas is selected from silver and silver alloys and wherein the diffusible gas is oxygen.

22. The process of claim 13, wherein said gas stream is continuously mixed with a portion of the gaseous environment to be tested prior to contact with the external diffusing surface of the permeable metal portion of the sensing element.

23. The process of claim 13, where samples of the gaseous environment to be tested are periodically injected into said gas stream.

24. An apparatus for detecting the presence of a contaminant in a gaseous environment comprising:
1. a sensing element in the form of a deflectable metal diaphragm, said metal being capable of being reversibly poisoned by adsorption and desorption of the contaminant and said metal having internal and external diffusing surfaces;
2. means for bringing a gas stream containing a constant concentration of said diffusible gas into contact with said external diffusing surface of said metal diaphragm;
3. means for establishing a pressure differential between the space at the external diffusing surface and the space at the internal diffusing surface, to cause a measurable deflection of said diaphragm;
4. means for mixing a sample of the gaseous environment to be tested with said gas stream;
5. means for monitoring said deflections of said diaphragm; and
6. means for purging said contaminant from said permeable metal.

* * * * *